Patented Nov. 17, 1931

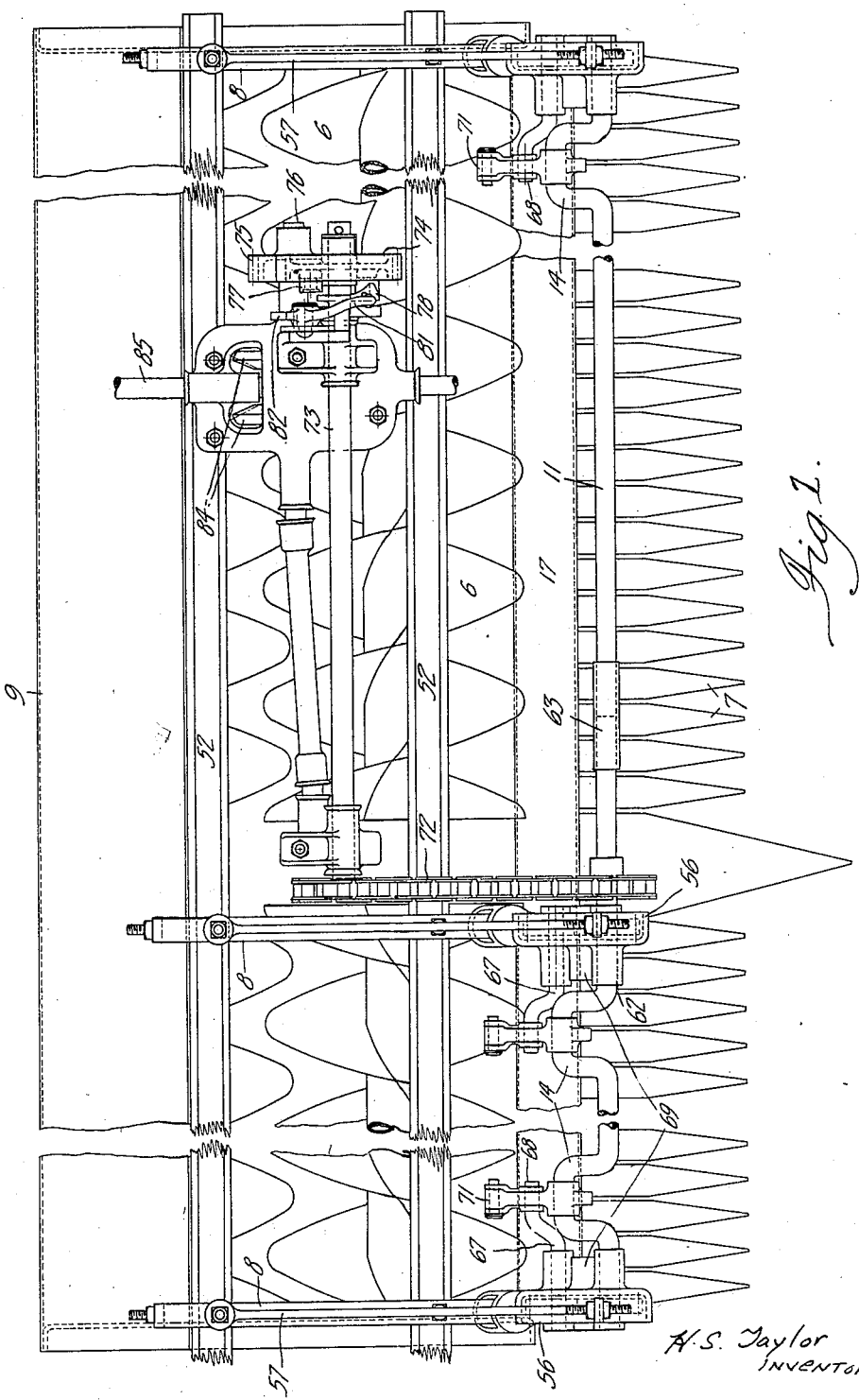

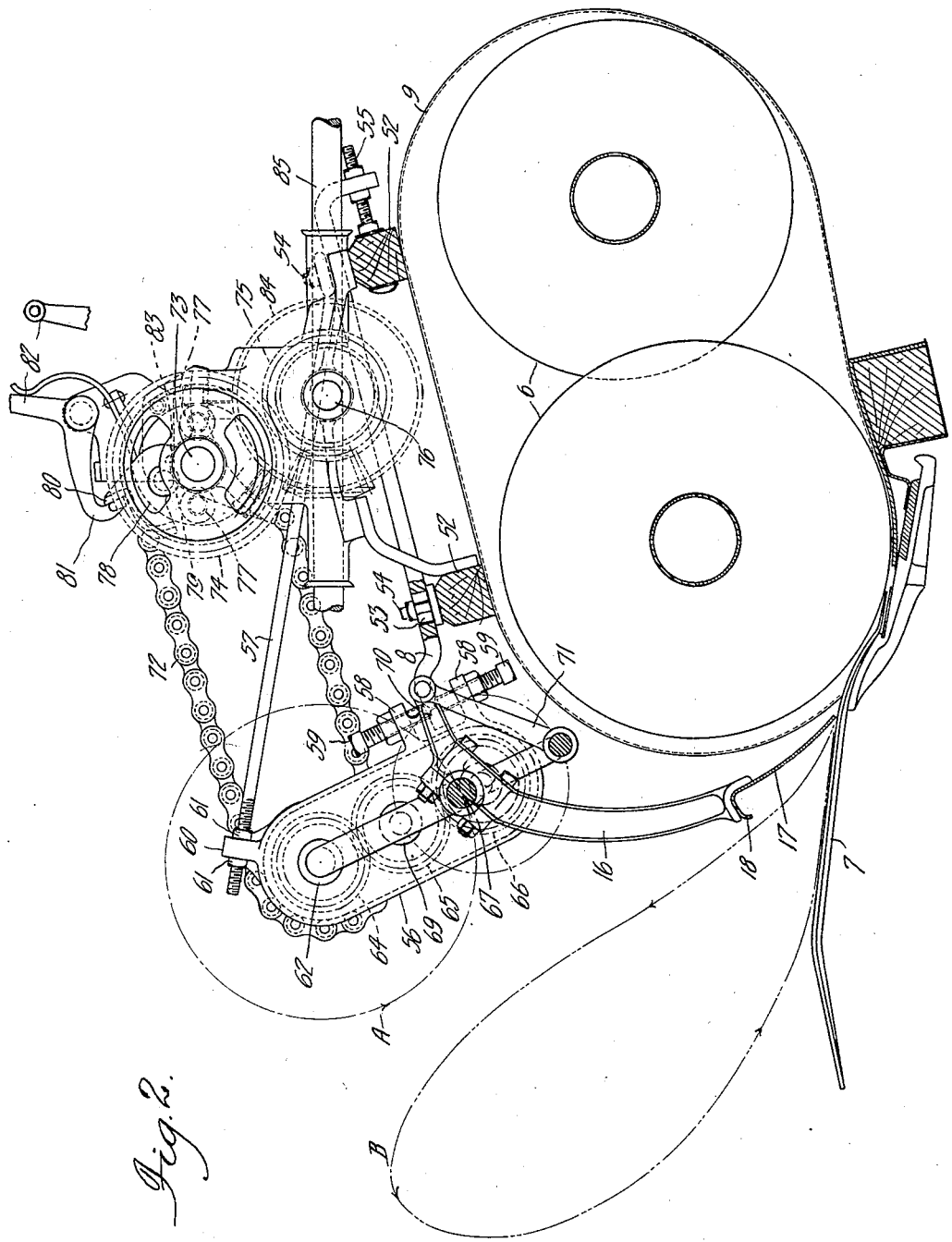

1,832,154

UNITED STATES PATENT OFFICE

HEADLIE SHIPARD TAYLOR, OF SUNSHINE, VICTORIA, AUSTRALIA, ASSIGNOR TO H. V. McKAY PROPRIETARY LIMITED, OF SUNSHINE, VICTORIA, AUSTRALIA

APPARATUS FOR GATHERING AND FEEDING IN CROPS TO STRIPPER HARVESTING AND REAPER THRASHER MACHINES

Original application filed October 5, 1928, Serial No. 310,603, and in Australia December 23, 1927. Divided and this application filed January 18, 1930. Serial No. 421,877.

This application is a division of application S. N. 310,603, filed Oct. 5, 1928, now matured into Patent No. 1,817,429.

This invention relates to improvements in and connected with apparatus for gathering and feeding in crop to stripper harvesting and reaper-thrasher machines and refers especially to apparatus for gathering standing crop in advance of the comb and feeding it rearwardly thereover into the path of movement of rotary beaters or a knife situated in advance of a transverse conveyor or conveyors.

The object of the present invention is to provide a simple and durably constructed apparatus which will operate efficiently to gather the crop in advance of a comb without thrashing the heads thereof, and direct it rearwardly thereover to a rotary beater or a reaping knife in such a way as to prevent choking of the comb and loss of grain.

I accomplish the abovementioned object by mounting a batten or blade rigidly on the front ends of arms associated with and acted upon by cranks to impart forward and rearward movements to the arms and batten, and constraining cranks connected by links to the arms whereby the batten in its rearward movement will feed the crop into and over the comb and when adjacent to the stripper or reaping mechanism at the base of the comb will move upwardly at an angle and again enter the crop in advance thereof.

The invention comprises means for adjustably supporting the operative parts of the apparatus whereby it can be readily adapted to particular requirements and the driving mechanism may embody means for throwing the apparatus into and out of action as and when required.

In order that the invention may be readily understood reference will now be had to the accompanying sheets of explanatory drawings wherein:—

Figure 1 is a view in plan of portion of the crop gathering and conveying mechanism of a reaper thrasher machine fitted with improvements constructed in accordance with the present invention.

Figure 2 is a view in sectional end elevation of Figure 1.

In these drawings wherein a practical embodiment of the invention is shown as adapted for use with a reaper thrasher having a pair of helical transverse conveyors 6 at the base of a comb 7, a series of brackets 8 is fitted to the top of the casing or to reinforcing bars 52 thereon whereby they can be adjusted to project more or less beyond the front thereof as desired and this adjustment may be effected by slotted holes 53 in the brackets engaging fastening bolts 54 and by providing screw adjustment members 55 between the brackets and their supports.

The front end of each bracket 8 supports a gear casing 56 the upper part of which is connected by an adjustable tie rod 57 or the like to a rear part of the conveyor casing as by one of the bolts 54 whereby the upper part can be adjusted forward or backward and retained in any desired position.

The lower part of each gear casing 56 is provided with a pair of rearwardly projecting lugs 58 arranged to receive opposed set screws 59 the points of which are adapted to bear in recesses formed on the top and underside of the forward end of the bracket. By adjusting the set screws 59 the gear casing can be elevated or lowered as desired. The front end of the adjustable tie rod 57 can pass through a hole in a lug 60 on the top of the gear casing and is screw-threaded to take nuts 61, the adjustment of which permits the upper end of the said casing to be set forwardly or backwardly as desired.

The gear casings 56 are provided near their upper ends with laterally disposed bearing bosses 62 having a transverse shaft 11 rotatively mounted therein and this shaft adjacent to each gear casing is shaped into or formed with a crank 14.

For convenience in assembling, the shaft 11 may be formed in two or more parts which are rigidly connected by sleeves 63 or the like.

A gear wheel 64 is fitted to the shaft 11 on the opposite side of each gear casing to that furnished with the bearing boss and meshes with an intermediate gear 65 which in turn meshes with a driving gear 66 fitted to a short spindle 67 formed with a crank 68 arranged to rotate in unison with the adjacent crank 14 on the transverse shaft.

The spindle supporting the intermediate gear wheel 65 is mounted in a boss 69 on the centre of the gear casing which is provided with a laterally projecting flange to house the said gear wheels.

A series of curved arms 16 is pivotally supported on the cranks 14 of the transverse shaft and the forward ends of the said arms are fitted to the upper edge of a batten or blade 17 which extends the full length of the comb.

The pivoted ends of the arms 16 are provided with rearward extensions 70 which are connected by links 71 to the cranks 68 on the spindles supported in the lower ends of the gear casings.

The cranks 68 on the spindles supported in the lower part of the gear casings are substantially shorter than the cranks 14 of the transverse shaft and the first mentioned cranks are disposed in such a way that they will not contact with the larger cranks when the apparatus is in operation. In the drawings the cranks 14 are shown spaced at 180° in advance of the cranks 68 but it will be obvious that they can be arranged at slightly less or slightly more than 180° in advance of the cranks 68.

By adjusting the members 8, 57 and 59 supporting the gear casings the bearings for the transverse shaft and for the cranked spindles can be set in transverse alignment with each other to ensure freedom of operation.

The transverse shaft 11 is adapted to be rotated by chain and sprocket gearing 72 or other approved mechanism from a transverse shaft 73 or other convenient part of the machine and suitable clutch mechanism can be associated with the said transmission gearing to permit the shaft to be rotated as and when desired.

The cranks 14 and 68 on the transverse shaft and on the spindles have the same angular speed and the link connections 71 between the shorter cranks and the rearward extensions 70 on the arms result in the batten 17 being directed rearwardly over and close to the comb and to take a path (indicated by the chain dotted line B in Figure 2) which will facilitate the "feeding in" of the crop to the base of the comb.

The constraining effect of the shorter cranks 68 and their connections with the rearward extensions 70 on the arms 16 cause the lower edge of the batten to be held stationary for a moment when it reaches the innermost point of its travel over the comb and the upper edge to feather rearwardly prior to passing upwardly close to the front of the transverse conveyor.

During the upward movement of the batten the forward ends of the arms move upwardly in advance of the pivot points thereof, thereby causing the batten to feather forwardly and in its outward and downward movement it feathers downwardly so as to enter the crop more or less edgewise.

The cranks 14 and 68 supporting and guiding the arms cause the lower edge of the batten to be moved rearwardly close to the top of the comb for the whole or greater part of those portions of the fingers at the rear of the tapered points thereby preventing straw or other growth becoming jammed between the comb fingers.

By suitably altering the sizes of the cranks 14 and 68 and the lengths of the links 71 and rearward extensions on the arms, the path of the batten may be varied to suit different machines or combs.

It will be obvious that the transverse shaft 11 can be made in two or more independent sections and that the arms on each section can be provided with a batten.

When the transverse shaft and batten are formed of two or more independent sections, the different sections of the batten can be arranged to move one in advance of the other so that the whole length of the comb is not being operated on at the one time.

Each section of the batten carrying mechanism is provided with separate driving gear and with clutch mechanism when desired.

The gearing for transmitting motion to the transverse shaft may embody trip or "cut out" mechanism whereby the batten can be operated continuously or "intermittently" as desired.

The transverse shaft 73 from which motion is imparted to the operative parts of the mechanism is provided with a rotatively mounted gear wheel 74 which is adapted to mesh with a wheel 75 fitted on a parallelly disposed drive shaft 76. The gear wheel 74 on the shaft 73 is provided with laterally projecting pins 77 adapted to contact with a hook shaped clutch member 78 pivotally supported on a lug 79 on a boss which is rigidly secured to the shaft 73.

The hook shaped clutch member 78 is adapted to engage with a pin 77 on the gear wheel 74 by means of a spring (not shown) and means are provided for normally maintaining the hook shaped clutch member clear of the path traversed by the pins 77.

The means for maintaining the hook shaped clutch member 78 out of engagement with the pins 77 may comprise a vertical projection 80 thereon and a hook shaped pawl 81 pivoted to the framing of the machine and maintained by spring pressure or gravity in advance of the said upward extension.

The hook shaped pawl 81 may be provided with an arm 82 to which is connected a pull cord or like operating member by actuating which the said pawl can be moved from in advance of the projection 80 on the clutch member 78 whereby the pawl will engage with one of the pins 77 on the gear wheel on the shaft 73.

When the hook shaped clutch member 78 engages with a pin 77 on the gear wheel the said wheel will be placed in fixed relationship with the shaft 73 and cause the transverse shaft to be rotated and the batten to be moved as hereinbefore described to feed the crop into the comb or to remove any material jammed between the teeth thereof.

The gear wheel 74 on the shaft 73 will remain operatively connected thereto while the retaining pawl 81 is held in its inoperative position. When the pawl is released it will descend so as to lie in the path of the projection 80 on the hook shaped clutch member and when the said projection contacts with the pawl the hook shaped clutch member will be pivoted and caused to move clear of the pin 77 on the gear wheel thereby enabling the said gear wheel to rotate freely on and without imparting motion to the transverse shaft.

The hook shaped clutch member is formed with a heel piece 83 which is adapted to bear against the boss supporting the lug 79 when the said clutch member is in a raised position. The heel piece prevents the clutch member being swung rearwardly into an inoperative position.

The means for automatically placing the crop feeding mechanism into and out of action may be so adjusted that when it is thrown out of action the batten will be supported at the highermost point of its travel where it will not interfere with the crop entering the comb.

The clutch mechanism permits the batten to be operated intermittently or when required to free the comb from jammed straw or other material and it may be made to cut out automatically on completing a single revolution.

The drive shaft 76 is operated by means of gearing 84 from a shaft 85 or in any other approved way. If preferred the trip or cut out mechanism can be arranged at any approved point between the shaft 73 and the operative mechanism on the main part of the machine.

The adjustment provided by the different parts of the invention are essential in view of the fact that harvesting machines are not made with a great degree of accuracy and provision must therefore be made for adjusting the parts of the invention to ensure the best results being obtained from each machine.

I claim:—

1. In apparatus for gathering and feeding in crop to and over the combs of stripper harvesting and reaper thrasher machines, a shaft rotatively mounted above the comb, gearing for imparting rotation to the shaft, cranks on the shaft, arms pivotally mounted on the cranks, a batten fitted to the forward ends of the arms, spindles rotatively mounted below the shaft, short cranks on the spindles, gearing for imparting rotation from the shaft to the spindles, extensions projecting rearwardly from the pivot points of the arms, and link connections between the extensions and the short cranks on the spindles.

2. Apparatus for gathering and feeding in crop to and over the combs of stripper harvesting and reaper thrasher machines comprising a shaft rotatively mounted above the comb, cranks of substantially large throw on the shaft, arms having their rear ends pivoted to the cranks, a batten fitted to the forward ends of the arms, spindles rotatively supported below the shaft, gearing for transmitting motion from the shaft to the spindles, short cranks on the spindles, and connections between the short cranks and the arms, constructed and arranged whereby the batten will be moved rearwardly with its lower edge in contact with or close to the comb to feed the crop rearwardly and to free any material jammed between the fingers of the comb.

3. In apparatus for gathering and feeding crop to a beater or transverse conveyor at the base of a comb of a stripper harvesting or reaper thrasher machine, a shaft rotatively mounted above the casing, cranks on the shaft, curved arms pivotally mounted on the cranks, a batten fitted to the forward ends of the arms, spindles rotatively mounted below the shaft, gearing for imparting uniform rotation to the shaft and spindles, extensions projecting rearwardly from the pivot points of the arms and link connections between the extensions on the arms and the short cranks on the spindles.

4. In apparatus of the class described, brackets supported above the casing of a beater or transverse conveyor, gear casings adjustably mounted on the brackets, a shaft rotatively mounted in the upper ends of the gear casings, spindles rotatively mounted in the lower parts of the gear casings, gear wheels fitted to the shaft and spindles, intermediate gear wheels meshing with the gear wheels on the shaft and spindles, cranks of substantially large throw on the shaft, shorter cranks on the spindles, arms pivotally mounted on the cranks on the shaft, a batten fitted to the forward ends of the arms, rearward extensions on the arms, link connections between the rear extensions on the arms and the cranks on the spindles, and mechanism for imparting rotation to the shaft.

5. In apparatus according to claim 4, a shaft rotatively mounted at the rear of the crank shaft, a gear wheel rotatively mounted on the shaft, a second shaft having a gear wheel meshing with the rotatively mounted gear wheel, pins projecting laterally from the rotatively mounted gear wheel, a hook shaped clutch member pivotally supported on a member fitted to the first mentioned shaft and adapted to engage the pins on the rotatively mounted gear wheel, a projection on the hook shaped clutch member, a pawl adapted to engage with the projection on the clutch member to retain it out of engagement with the pins, and means for actuating the said pawl.

6. In apparatus according to claim 4, brackets adjustably mounted on the casing of the beater or transverse conveyor, gear casings adjustably mounted on the brackets and supporting the shaft rotatively in their upper ends and their spindles in their lower ends, said gear casings enclosing the gear wheels for transmitting motion from the shaft to the spindles.

7. In apparatus according to claim 3, lugs on the gear casings supporting opposed set screws, recesses in the forward ends of the brackets for engaging the ends of the set screws, tie rods having their rear ends secured to the brackets and their upper and forward ends adjustably connected to the upper part of the gear casings.

In witness whereof I hereunto affix my signature.

HEADLIE SHIPARD TAYLOR.